June 19, 1962 R. W. HUGHES 3,040,130

REPEATER STATION FOR A BIDIRECTIONAL COMMUNICATION SYSTEM

Filed Dec. 24, 1958 2 Sheets-Sheet 1

INVENTOR.
ROBERT W. HUGHES

BY Alfred C. Hill

AGENT

REPEATER STATION FOR A BIDIRECTIONAL COMMUNICATION SYSTEM

Filed Dec. 24, 1958 2 Sheets-Sheet 2

INVENTOR.
ROBERT W. HUGHES
BY Alfred C. Hill
AGENT 3,040,130

REPEATER STATION FOR A BIDIRECTIONAL COMMUNICATION SYSTEM

Robert W. Hughes, Mountain Lakes, N.J., assignor to International Telephone and Telegraph Corporation, Nutley, N.J., a corporation of Maryland Filed Dec. 24, 1958, Ser. No. 782,870
18 Claims. (Cl. 178—71)

This invention relates to repeater stations for bidirectional pulse communication systems and more particularly to improved drop-and-insert equipment for such repeater stations.

In present-day microwave pulse communication systems, it is quite often required that communication on one or more channels of the pulse trains traveling in opposite directions in the system be provided between a repeater station and both terminal stations or other repeater stations. This is conventionally provided by employing a drop-and-insert unit for each direction of communication. The drop-and-insert unit detects the synchronizing marker pulse of its associated pulse train and thereby is able to select a particular channel pulse and detect the intelligence therefrom to provide for the desired communication between the repeater and the terminal or intermediate repeater station. The drop-and-insert unit is able to generate a new channel pulse modulated with either the information at the repeater station or the through information or both and to insert this new channel pulse or channel information into the pulse train. It is possible in these bidirectional drop-and-insert arrangements for use in pulse systems to synchronize the eastgoing and westgoing pulse trains. When this is done, the eastgoing and westgoing pulse trains have a fixed time relationship with respect to each other, although the amount of time delay between a specified channel pulse in each of the two pulse trains is dependent upon the location of the repeater station from the master terminal station.

An object of the present invention is to provide an improved drop-and-insert arrangement for a repeater station which will provide considerable savings in equipment over the previously employed drop-and-insert arrangement at repeaters.

Another object of this invention is to provide a drop-and-insert arrangement for a repeater station which will provide party-line operation or, in other words, simultaneous communication with both the eastgoing and the westgoing terminals with a minimum of equipment.

Still another object of this invention is to employ a bidirectional pulse communication system wherein the eastgoing and westgoing pulse trains are synchronized and interleaved such that a particular channel of each of the pulse trains is in a fixed time relationship with respect to each other and to employ a single drop-and-insert unit to provide desired party-line communication between the repeater and both the terminals.

A feature of this invention is the provision of a single drop-and-insert unit for utilization in a repeater station to enable party-line communication between the repeater station and the terminal stations by electronically switching the drop-and-insert unit into a first communication path through the repeater station, say the eastgoing path, and into a second communication path through the repeater station, say the westgoing communication path.

Another feature of this invention is the provision of gating circuits as the electronic switching means triggered by the channel gating or timing pulse of the channel upon which party-line communication is desired between the repeater and the terminals.

Still another feature of this invention is the triggering of the gate circuits to alternately switch the single drop-and-insert unit between the first and second communication paths through the repeater station in response to the trailing edge of the timing pulse of the selected channel pulse for party-line communication between the repeater and the terminal stations.

A further feature of this invention is the provision of a gating arrangement to alternately switch the single drop-and-insert unit between the two communication paths through the repeater station and at the same time to provide direct communication through the repeater station for that path which is not occupied by the drop-and-insert equipment.

The above-mentioned and other features and objects of this invention will become more apparent by reference to the following description taken in conjunction with the accompanying drawings, in which.

Figure 1:
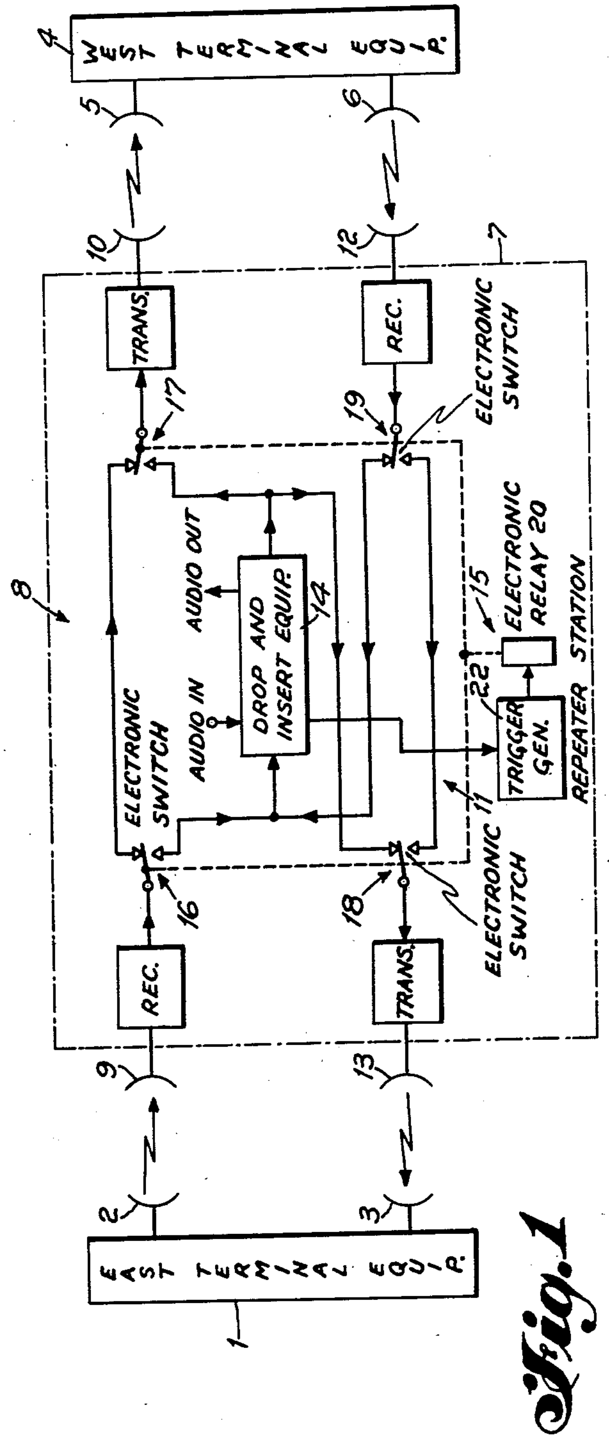
FIG. 1 is a block diagram of a communication system employing the drop-and-insert equipment in accordance with the principles of this invention.

Referring to FIG. 1, the communication system in which the repeater station of this invention is incorporated is illustrated schematically as comprising an east terminal 1 incorporating as a component thereof a transmitting antenna 2 and a receiving antenna 3 and a west terminal 4 including thereon as integral components thereof a receiving antenna 5 and a transmitting antenna 6. Intermediate terminals 1 and 4 is disposed at least one repeater station illustrated as repeater station 7. It is to be remembered that while the illustration of FIG. 1 illustrates only one repeater station, it is possible in accordance with the teachings of this invention to incorporate the components of the repeater station 7 at more than one point between the terminal equipments 1 and 4 and to provide party-line communications between the repeaters.

Repeater station 7 includes a first communication path 8 therethrough illustrated herein to be the path relaying the westgoing pulse train from the receiving antenna 9 of the repeater to the transmitting antenna 10 thereof. Repeater 7 also includes a second communication path 11 therethrough to relay the eastgoing pulse trains from receiving antenna 12 to the transmitting antenna 13. The cooperation of communication paths 8 and 11 enables two-way communication through repeater station 7 between the east and west terminal equipments 1 and 4 or intermediate repeater stations.

In accordance with the principles of this invention, the repeater station 7 operates in a communication system employing synchronized east and westgoing pulse trains. In other words, the pulse train traveling from the terminal 4 to terminal 1, such as shown in curve A of FIG. 2, has a given time relationship with respect to the westgoing pulse train traveling from terminal 1 to terminal 4, such as illustrated in curve B. It will be observed that the individual channel signals in each of the pulse trains of curves A and B have a fixed time relationship with respect to each other, this time relationship being dependent upon the location of the repeater station with respect to the master terminal station, that terminal station which causes the synchronization of the two pulse trains.

To enable communication between repeater station 7 and either of the terminals 1 and 4 or intermediate repeater stations, drop-and-insert equipment is necessary. As pointed out hereinabove, drop-and-insert equipment had been previously employed in direction connection with each of the communication paths, such as paths 8 and 11.

However, in accordance with the principles of this invention, the communication between repeater station 7 and the east and west terminals 1 and 4 can be carried on in a communication system employing synchronized pulse trains as described in connection with curves A and B of FIG. 2 by employing a single drop-and-insert unit 14 and an electronic switching means 15 including electronic switches 16, 17, 18 and 19 and electronic relay 20. The function of electronic switching means 15 is to appropriately time the operation of electronic switches 16, 17, 18 and 19 to switch drop-and-insert unit 14 into communication path 8 or 11 and to provide a direction connection between the antennas of the communication path from which unit 14 has been removed, said antennas constituting the input and output of said communication paths.

Let us consider the operation of the drop-and-insert unit in repeater 7 in accordance with the principles of this operation. A pulse train similar to that shown in curve A, FIG. 2 is coupled to the input of communication path 11, antenna 12, said pulse train being applied through electronic switch 19 in the position illustrated to the input of drop-and-insert equipment 14. Drop-and-insert equipment 14 detects the synchronizing pulse M of the pulse train of curve A, FIG. 2. The detected marker or synchronizing pulse operates to produce a channel timing pulse whose timing is time coincident with the channel in which communication between the repeater and the terminals is accomplished. The proper timing can be accomplished by employing well known phase shifting circuits (delay lines) to shift the pulse generated from the synchronizing pulse to the proper time position for selection of the appropriate channel pulse for application to the audio demodulation circuit. This channel timing pulse, for instance, may be pulse 21 of curve C, FIG. 2. Timing pulse 21 will operate to separate the pulse signal of channel 1 from the pulse train of curve A and to demodulate or remove the intelligence therefrom. The timing pulse 21 is also coupled to trigger generator 22. Drop-and-insert equipment 14 also inserts into the pulse train at the output thereof a channel pulse positioned to take the place of the pulse removed from the pulse train of curve A so that communication may be had with the east terminal 1. The reconstructed pulse train is then coupled through electronic switch 18 for application to the output of communication path 11, antenna 13.

Figure 2:
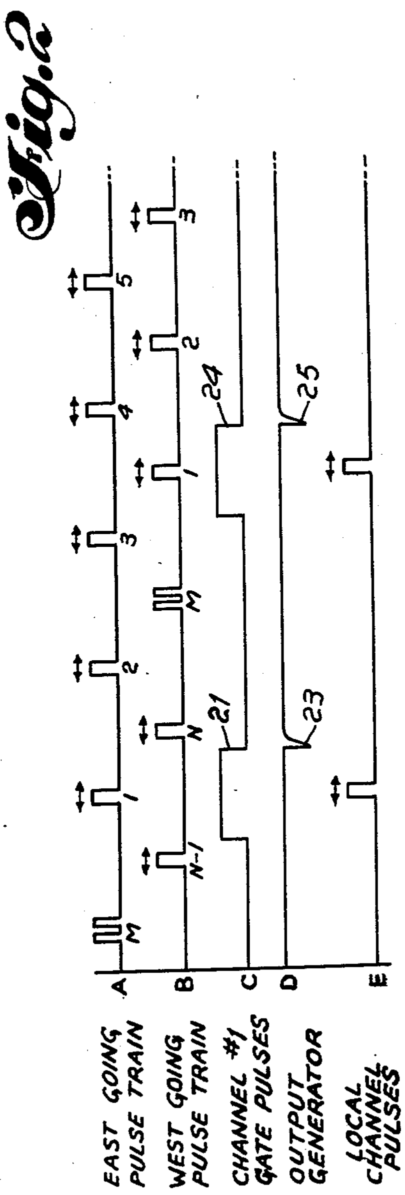
FIG. 2 is a series of curves illustrating the operation of the repeater station of FIG. 1.

While the pulse train of curve A, FIG. 2 is being passed through and operated upon by the drop-and-insert unit 14, the electronic switches 16 and 17 are in the position indicated so that the westgoing pulse train, the pulse train of curve B, FIG. 2, is coupled directly from the input means, antenna 9, to the output means, antenna 10, for direct relaying to the west terminal 4. At the time of occurrence of the trailing edge of timing pulse 21, trigger generator 22 produces a trigger pulse 23 for application to electronic relay 20 which operates to place the electronic switches 16, 17, and 18, 19 in their other position. This operation will then connect the input, antenna 12, directly to the output, antenna 13, of communication path 11 and will also operate to connect the westgoing train, the pulse train of curve B, FIG. 2 to the input of drop-and-insert unit 14. This action, in response to the timing pulse generated by the marker of the pulse train on path 11, switches the drop-and-insert equipment 14 into path 8 so that communication may be received at the repeater station from the east terminal and communication may be directed from the repeater station toward the west terminal.

Drop-and-insert unit 14 operates on the pulse train of curve B substantially as it did on the pulse train of curve A, FIG. 2. Namely, drop-and-insert equipment 14 detects the marker of synchronizing pulse M of curve B and produces therefrom a timing pulse 24, appropriately timed through means of phase shifting circuits (time delay circuits) to select and demodulate the pulse signal of channel 1 of the westgoing pulse train (curve B). The pulse signal of channel 1 coming from east terminal 1 is demodulated in drop-and-insert unit 14, and a new channel pulse modulated in accordance with the information at the repeater station 7 is inserted into the westgoing pulse train for communication with terminal 4. At the time of occurrence of the trailing edge of pulse 24, trigger generator 22 produces a trigger pulse 25 to operate upon electronic relay 20 to place the electronic switches 16, 17, and 18, 19 back into their original and illustrated position so that the drop-and-insert unit 14, in response to the timing pulse of channel 1 of the pulse train traveling on path 8, switches the drop-and-insert equipment into path 11 to repeat the operation hereinabove described when drop-and-insert equipment 14 was connected in communication path 11.

It is through the arrangement and operation described hereinabove that a single drop-and-insert equipment 14 is able to be switched between the two communication paths 8 and 11 of repeater station 7 to accomplish the desired result, namely, party-line communication between the east and west terminals from the repeater station, that is, simultaneous communication with both the eastgoing and westgoing terminals 4 and 1 from relay station 7 or repeater stations therebetween.

Figure 3:
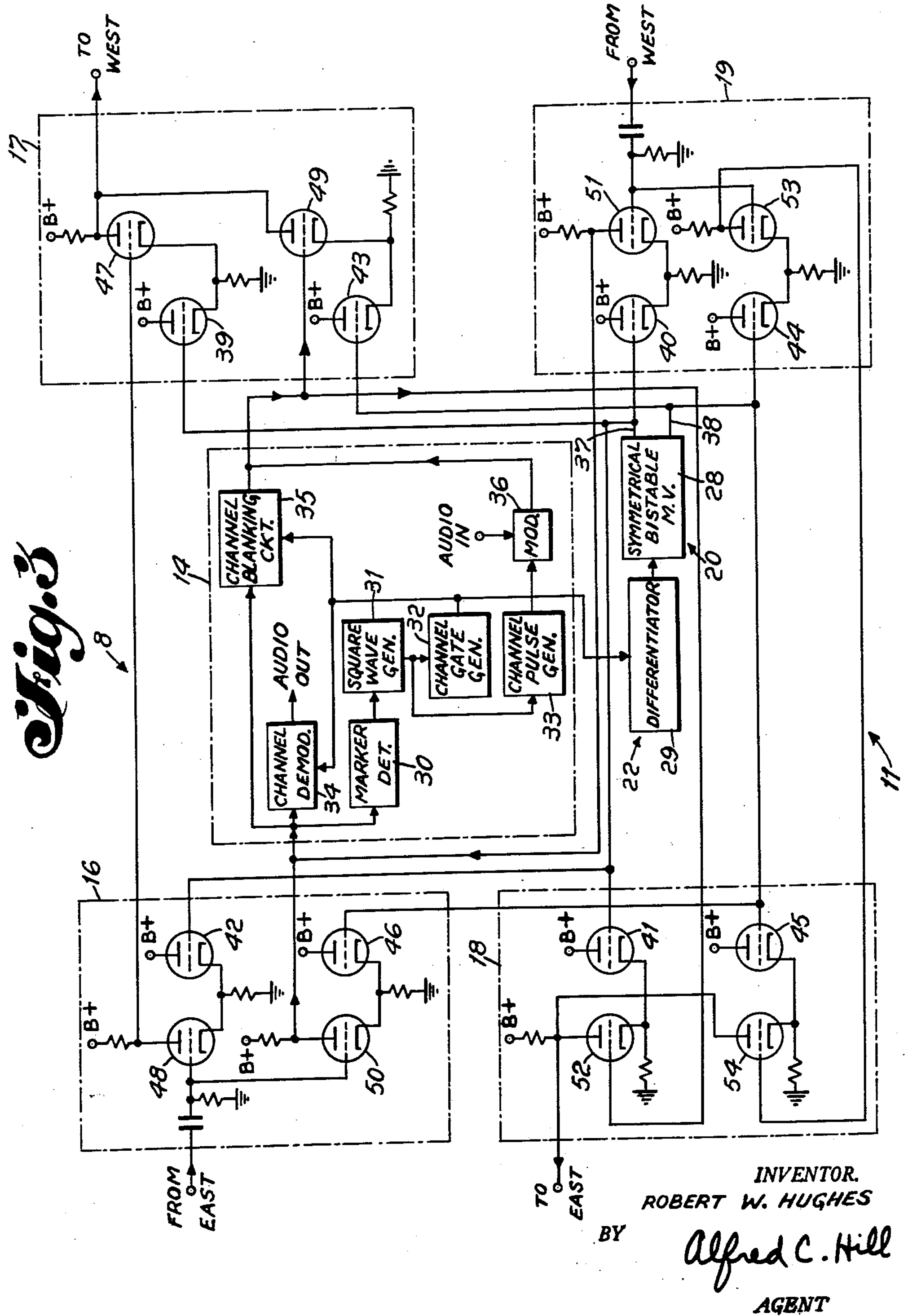
FIG. 3 is a block diagram illustrating in greater detail the repeater station in accordance with the principles of this invention.

Referring to FIG. 3, the repeater station 7 is illustrated in greater detail to particularly point out an example of the form certain of the components of the system of FIG. 1 could take and to show in greater detail the components of the drop-and-insert equipment 14. In accordance with the illustration of FIG. 3, one form which the electronic switches 16, 17, 18 and 19 may take is the gating arrangement illustrated in greater detail therein. The electronic relay 20 may take the form of a symmetrical bistable multivibrator 28, while the trigger generator 22 may take the form of a differentiator 29. A properly biased diode would be employed to remove the trigger pulse resulting from the differentiation of the leading edge of the timing pulse. When a pulse train, such as either the pulse train of curve A or curve B of FIG. 2 is applied to the input of the drop-and-insert equipment 14, the marker or synchronizing signal is detected in marker detector 30, the output of which activates a square wave generator 31 to produce a square wave signal which is applied to channel gate generator 32 and a channel pulse generator 33. Channel gate generator 32 provides the proper time delay for the output of square wave generator for time coincidence with the selected channel which is employed for communication between the repeater station and the terminals. The output of channel gate generator 32 may be either pulse 21 or 24 of curve C, FIG. 2 depending upon which of the pulse trains was applied to the input of drop-and-insert equipment 14. The output of gate generator 32 is applied to the channel demodulator 34 which operates to pick off from the input pulse train the selected channel pulse and to cooperate in the demodualtion thereof to recover the intelligence of this selected channel. The received pulse train is likewise passed to a channel blanking circuit 35 such that the output of gate generator 32 may be employed to blank out the channel pulse of the selected channel for communication at the repeater station. The output of square wave generator 31 as pointed out hereinabove was also sent around to chanel pulse generator 33 which incorporates therein the desired time delay to reconstruct a channel pulse for appropriate replacement of the received channel pulse of the channel employed for communication between the repeater and terminal stations. The output of pulse generator 33 is applied to modulator 36 which modulates this pulse with the audio input from the repeater station. The output of modulator 36, the modulated channel pulse, is applied to the output of channel blanking circuit 35 so that the locally generated channel pulse may take its appropriate time location in the composite pulse train. The reconstructed pulse train is then applied to the output of drop-and-insert equipment 14 for routing in accordance to the appropriate positions of the electronic switches 16, 17, 18, and 19.

In accordance with the detailed disclosure of FIG. 3, the electronic switches 16, 17, 18, and 19 may take the form of gate circuit as illustrated therein. The operation of the switching that takes place in the repeater station 7 will now be described in connection with the gating circuits which constitute the electronic switches 16 to 19 of FIG. 3.

Bistable multivibrator 28 is connected to have two outputs 37 and 38. This is accomplished by connecting an output terminal to the anode of each of the discharge devices making up the multivibrator. The output 37 is connected to the grid of triode 39, to the grid of triode 40, to the grid of triode 41, and to the grid of triode 42. The output 38 is connected to the grid of triode 43, to the grid of triode 44, to the grid of triode 45, and to the grid of triode 46. In describing the operation of this gating arrangement, it will be assumed that the electronic switches 16 to 19 of FIG. 3 have in essence the same position as the schematic switches of FIG. 1. To fulfill this assumption it will be required that a negative or relatively low voltage be present at output 37 and a positive or relatively high voltage be present at the output 38. Under these conditions triodes 39 and 42 will be rendered non-conductive which will place the cathode of triodes 47 and 48 at a relatively low voltage with respect to the grids thereof so that triodes 47 and 48 will conduct. The conduction of triodes 47 and 48 directly connects communication path 8 between the input and output thereof.

Triodes 43 and 46 connected to the output 38 of multivibrator 28 are rendered conductive which places a relatively large voltage on the cathode of triodes 49 and 50 to thereby render these triodes 49 and 50 non-conductive assuring that unit 14 is not connected in path 8.

Triodes 40 and 41 connected to output 37 are rendered non-conductive thereby providing a relatively low voltage at the cathodes of triodes 51 and 52 such that triodes 51 and 52 are conductive. This conduction of triodes 51 and 52 connects drop-and-insert equipment into the communication path 11. Triodes 44 and 45 connected to output 38 of multivibrator 28 are rendered conductive thereby placing a relatively large positive voltage on the cathodes of triodes 53 and 54, rendering triodes 53 and 54 non-conductive assuring that path 11 is not connected directly between the input and output thereof.

When the trailing edge of timing pulses 21 triggers multivibrator 28 so that the opposite voltage conditions appear at outputs 37 and 38, that is, a high or positive voltage at output 37 and a low or negative voltage at output 38, the conduction conditions for the triodes 39 to 46 will be reversed from that described hereinabove. The reversed conduction condition of these triodes will reverse the conduction conditions of triodes 47 to 54 such that drop-and-insert unit 14 will now be connected through the conducting triodes 50 and 49 to the input and output of communication path 8 and the input and output of communication path 11 will be coupled directly to each other through the conducting triodes 53 and 54.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a communication system having a plurality of time multiplexed communication signals, a repeater station including a first communication path for relaying certain of said communication signals to stations in a first direction therefrom, a second communication path for relaying others of said communication signals to stations in a second direction therefrom, a drop-and-insert unit, and an electronic switching means coupled to said drop-and-insert unit and said first and second paths alternately responsive to a given one of said certain of said communication signals and a given one of said other of said communication signals to switch said drop-and-insert unit between said second path and said first path, respectively, to enable party-line communication between said repeater station and the stations in said first and second directions therefrom.

2. In a communication system having a plurality of time multiplexed communication signals, a repeater station including a first communication path for relaying certain of said communication signals to stations in a first direction therefrom, a second communication path for relaying others of said communication signals to stations in a second direction therefrom, a drop-and-insert unit, a first electronic switching means coupled to said drop-and-insert unit and said second path responsive to a given one of said certain of said communication signals to switch said drop-and-insert unit to said second path and a second electronic switching means coupled to said drop-and-insert unit and said first path responsive to a given one of said other of said communication signals to switch said drop-and-insert unit to said first path.

3. In a communication system having a plurality of time multiplexed communication signals, a repeater station including a first communication path for relaying certain of said communication signals to stations in a first direction therefrom, a second communication path for relaying others of said communication signals to stations in a second direction therefrom, a drop-and-insert unit, a first electronic switching means coupled to said first path and said drop-and-insert unit, a second electronic switching means coupled to said second path and said drop-and-insert unit and means coupled to said drop-and-insert unit and in common to said first and second switching means responsive to a given one of said certain of said communication signals and a given one of said other of said communication signals to activate, respectively, said first and second switching means to switch said drop-and-insert unit between said second and first paths, respectively, to enable party-line communication between said repeater station and the stations in said first and second directions.

4. In a communication system, a repeater station including a first source of a first pulse train having a synchronizing pulse and a plurality of time multiplexed communication pulse for travel in a first direction from said repeater station, a second source of a second pulse train having a synchronizing pulse and a plurality of time multiplexed communication pulses for travel in a second direction from said repeater station, said first and second pulse trains being in a given time relationship with respect to each other, a first communication path coupled to said first source for relaying said first pulse train to stations in said first direction, a second communication path coupled to said second source for relaying said second pulse train to stations in said second direction, a drop-and-insert unit selectively coupled to said first and second paths including a synchronizing pulse detector alternately responsive to the synchronizing pulse of said first and second pulse trains and a pulse generator coupled to the output of said detector to produce a timing pulse timed for coincidence with a given one of the communication pulses of each of said pulse trains, and an electronic switching means coupled to said drop-and-insert unit and said first and second paths responsive to said timing pulses to switch said drop-and-insert unit between said second and first paths, respectively, to enable party-line communication between said repeater station and the stations in said first and second directions.

5. In a communication system, a repeater station coupled to a first source of a first pulse train having a synchronizing pulse and a plurality of time multiplexed communication pulses for travel in a first direction and a second source of a second pulse train having a synchronizing pulse and a plurality of time multiplexed communication pulses for travel in a second direction, said first and second pulse trains being in a given time relationship with respect to each other, comprising a first communication path coupled to said first source for relaying said first pulse train to stations in said first direction, a second communication path coupled to said second source for relaying said second pulse train to stations in said second direction, a drop-and-insert unit selectively coupled to said first and second paths including a synchronizing pulse detector alternately responsive to the synchronizing pulses of said first and second pulse trains and a pulse generator coupled to the output of said detector to produce a timing pulse timed for coincidence with a given one of the communication pulses of each of said pulse trains, a first electronic switching means coupled to said drop-and-insert unit and said second path responsive to said timing pulse derived from said first pulse train to switch said drop-and-insert unit to said second path and a second electronic switching means coupled to said drop-and-insert unit and said first path responsive to said timing pulse derived from said second pulse train to switch said drop-and-insert unit to said first path.

6. In a communication system, a repeater station coupled to a first source of a first pulse train having a synchronizing pulse and a plurality of time multiplexed communication pulses for travel in a first direction and a second source of a second pulse train having a synchrouizing pulse and a plurality of time multiplexed communication pulses for travel in a second direction, said first and second pulse trains being in a given time relationship with each other, comprising a first communication path coupled to said first source for relaying said first pulse train to stations in said first direction, a second communication path coupled to said second source for relaying said second pulse train to stations in said second direction, a drop-and-insert unit selectively coupled to said first and second paths including a synchronizing pulse detector alternately responsive to the synchronizing pulse of said first and second pulse trains and a pulse generator coupled to the output of said detector to produce a timing pulse timed for coincidence with a given one of the communication pulses of each of said pulse trains, a first electronic switching means coupled to said first path and said drop-and-insert unit, a second electronic switching means coupled to said second path and said drop-and-insert unit, and means coupled to said pulse generator and in common to said first and second switching means responsive to said timing pulse derived from said first pulse train and said timing pulse derived from said second pulse train to activate, respectively, said first and second switching means to switch said drop-and-insert unit between said second and first paths, respectively, to enable party-line communication between said repeater station and the stations in said first and second directions.

7. In a communication system having a plurality of time multiplexed communication signals, a repeater station having a first communication path for relaying certain of said communication signals to stations in a first direction therefrom, a second communication path for relaying others of said communication signals to stations in a second direction therefrom, each of said paths having an input and an output a drop-and-insert unit, and a gate circuit arrangement cooperatively coupled to the input and output of each of said paths and said drop-and-insert unit, said gate circuit arrangement alternately responding to a given one of said certain of said communication signals and a given one of said other of said communication signals to switch said drop-and-insert unit between said second path and said first path, respectively, to enable party-line communication between said repeater station and the stations in said first and second directions therefrom.

8. In a communication system having a plurality of time multiplexed communication signals, a repeater station having a first communication path for relaying certain of said communication signals to stations in a first direction therefrom, a second communication path for relaying others of said communication signals to stations in a second direction therefrom, each of said paths having an input and an output, a drop-and-insert unit, a first gate circuit coupled to the input of said drop-and-insert unit and the input of said first path, a second gate circuit coupled to the output of said drop-and-insert unit and the output of said first path, said first and second gate circuits responding to a given one of said certain of said communication signals to switch said drop-and-insert unit to said second path, a third gate circuit coupled to the input of said drop-and-insert unit and the input of said second path, and a fourth gate circuit coupled to the output of said drop-and-insert unit and the output of said second path, said third and fourth gate circuits responding to a given one of said others of said communication signals to switch said drop-and-insert unit to said first path.

9. In a communication system having a plurality of time multiplexed communication signals, a repeater station having a first communication path for relaying certain of said communication signals to stations in a first direction therefrom, a second communication path for relaying others of said communication signals to stations in a second direction therefrom, each of said paths having an input and an output, a drop-and-insert unit having a signal input and a signal output, a first gate circuit coupled to the input of said first path and the input of said drop-and-insert unit, a second gate circuit coupled to the output of said first path and the output of said drop-and-insert unit, a third gate circuit coupled to said drop-and-insert unit and to the input of said second path and the output of said drop-and-insert unit, and a fourth gate circuit coupled to the output of said second path, and a trigger circuit coupled in common to said first and second gate circuits and said third and fourth gate circuits responsive to a given one of said certain of said communication signals and a given one of said other of said communication signals to activate, respectively, said first and second gate circuits and said third and fourth gate circuits to switch said drop-and-insert unit between said second and first pairs, respectively, to enable party-line communication between said repeater station and the stations in said first and second directions therefrom.

10. In a communication system, a repeater station coupled to a first source of a first pulse train having a synchronizing pulse and a plurality of time multiplexed communication pulses for travel in a first direction and a second source of a second pulse train having a synchronizing pulse and a plurality of time multiplexed communication pulses for travel in a second direction, said first and second pulse trains being in a given time relationship with respect to each other, comprising a first communication path for relaying said first pulse train to stations in said first direction, a second communication path for relaying said second pulse train to stations in said second direction, each of said paths having an input and an output, a drop-and-insert unit including a synchronizing pulse detector selectively coupled to the input of said first and second paths alternately responsive to the synchronizing pulse of said first and second pulse trains, a pulse generator coupled to the output of said detector to produce a timing pulse timed for coincidence with a given one of the communication pulses of each of said pulse trains and a signal output selectively coupled to the output of said first and second paths, and a gate circuit arrangement cooperatively coupled to said pulse generator, the input and output of each of said paths, said synchronizing pulse detector, and the output of said drop-and-insert unit said gate circuit arrangement responding to said timing pulses to switch said synchronizing pulse detector and the output of said drop-and-insert unit between said second and first paths, respectively, to enable party-line communication between said repeater station and the stations in said first and second directions.

11. A system according to claim 10, wherein said gate circuit arrangement includes means coupled to said pulse generator responsive to the trailing edge of said timing pulse.

12. In a communication system, a repeater station coupled to a first source of a first pulse train having a synchronizing pulse and a plurality of time multiplexed communication pulses for travel in a first direction and a second source of a second pulse train having a synchronizing pulse and a plurality of time multiplexed communication pulses for travel in a second direction, said first and second pulse trains being in a given time relationship with respect to each other, comprising a first communication path for relaying said first pulse train to stations in said first direction, a second communication path for relaying said second pulse train to stations in said second direction, each of said paths having an input and an output, a drop-and-insert unit including a synchronizing pulse detector selectively coupled to the input of said first and second paths alternately responsive to a synchronizing pulse of said first and second pulse trains, a pulse generator coupled to the output of said detector to produce a timing pulse timed for coincidence with a given one of the communication pulses of each of said pulse trains and a signal output selectively coupled to the output of said first and second paths, a first gate circuit coupled to the input of said first path, said synchronizing pulse detector, and said pulse generator, a second gate circuit coupled to the output of said first path, the output of said drop-and-insert unit, and said pulse generator, said first and second gate circuits responding to said timing pulse derived from said first pulse train to switch said synchronizing pulse detector and the output of said drop-and-insert unit to said second path, a third gate circuit coupled to thei input of said second path, said synchronizing pulse detector and said pulse generator and a fourth gate circuit coupled to the output of said second path, the output of said drop-and-insert units, and said pulse generator, said third and fourth gate circuits responding to said timing pulse derived from said second pulse train to switch said synchronizing pulse detector and the output of said drop-and-insert unit to said first path.

13. A system according to claim 12, wherein said first and second gate circuits and said third and fourth gate circuits each include a means coupled to said pulse generator to derive a trigger pulse corresponding in time to the trailing edge of their respective timing pulse.

14. In a communication system, a repeater station coupled to a first source of a first pulse train having a synchronizing pulse and a plurality of time multiplexed communication pulses for travel in a first direction and a second source of a second pulse train having a synchronizing pulse and a plurality of time multiplexed communication pulses for travel in a second direction, said first and second pulse trains being in a given time relationship with respect to each other, comprising a first communication path for relaying said first pulse train to stations in said first direction, a second communication path for relaying said second pulse train to stations in said second direction, each of said paths having an input and an output, a drop-and-insert unit including a synchronizing pulse detector selectively coupled to the input of said first and second paths alternately responsive to the synchronizing pulse of said first and second pulse trains, a pulse generator coupled to the ouput of said detector to produce a timing pulse timed for coincidence with a given one of the communication pulses of each of said pulse trains and a signal output selectively coupled to the output of said first and second paths, a first gate circuit coupled to the input of said first path and said synchronizing pulse detector, a second gate circuit coupled to the output of said first path and the output of said drop-and-insert unit, a third gate circuit coupled to the input of said second path and said synchronizing pulse detector, and a fourth gate circuit coupled to the output of said second path and the output of said drop-and-insert unit, and trigger circuit coupled to said pulse generator and in common to said first and second gate circuits and said third and fourth gate circuits responsive to said timing pulse derived from said first pulse train and said timing pulse derived from said second pulse train to activate, respectively, said first and second gate circuits and said third and fourth gate circuits to switch said synchronizing pulse detector and the output of said drop-and-insert unit between said second and first paths, respectively, to enable party-line communication between said repeater station and the stations in said first and second directions.

15. A system according to claim 14, wherein said trigger circuit includes a differentiator coupled to said pulse generator to produce a trigger pulse in time coincidence with the trailing edge of said timing pulse to activate said gate circuits.

16. In a communication system having a plurality of time multiplexed communication signals, a repeater station having a first communication path for relaying certain of said communication signals to stations in a first direction therefrom, a second communication path for relaying others of said communication signals to stations in a second direction therefrom, each of said paths having an input and an output, a drop-and-insert unit, and an electronic switching means cooperatively coupled to the input and output of each of said paths and said drop-and-insert unit, said electronic switching means being responsive to a given one of said certain of said communication signals to switch said drop-and-insert unit into said first path and to complete the connection between the input and output of said first path and responsive to a given one of said other of said communication signals to switch said drop-and-insert unit into said first path and to complete the connection between the input and output of said second path thereby enabling party-line communication between said repeater station and the stations in said first and second directions therefrom.

17. In a communication system having a plurality of time multiplexed communication signals, a repeater station having a first communication path for relaying certain of said communication signals to stations in a first direction therefrom, a second communication path for relaying others of said communication signals to stations in a second direction therefrom, each of said paths having an input and an output, a drop-and-insert unit, a first electronic switching means coupled to the input and output of said first path and said drop-and-insert unit responsive to a given one of said certain of said communication signals to switch said drop-and-insert unit to said second path and to complete the direct connection between the input and output of said first path and a second electronic switching means connected cooperatively to the input and output of said second path and said drop-and-insert unit responsive to a given one of said other of said communication signals to switch said drop-and-insert unit to said first path and to complete the direct connection between the input and output of said second path.

18. In a communication system having a plurality of time multiplexed communication signals, a repeater station having a first communication path for relaying certain of said communication signals to stations in a first direction therefrom, a second communication path for relaying others of said communication signals to stations in a second direction therefrom, each of said paths including an input and an output, a drop-and-insert unit, a first electronic switching means coupled to the input and output of said first path and said drop-and-insert unit, a second electronic switching means coupled to the input and output of said second path and said drop-and-insert unit, and means coupled to said drop-and-insert unit and in common to said first and second switching means responsive to a given one of said certain of said communication signals to activate said first and second switching means to switch said drop-and-insert unit into said second path and to complete the connection between the input and output of said first path and responsive to a given one of said other of said communication signals to activate said first and second switching means to switch said drop-and-insert unit into said first path and to complete the direct connection between the input and output of said second path.

References Cited in the file of this patent

UNITED STATES PATENTS

| | | |
|---|---|---|
| 2,607,852 | Rea | Aug. 19, 1952 |
| 2,761,896 | Foley et al. | Sept. 4, 1956 |
| 2,839,605 | Ridler et al. | June 17, 1958 |
| 2,941,034 | Alizon | June 14, 1960 |